(12) United States Patent
Hou

(10) Patent No.: US 11,876,704 B2
(45) Date of Patent: Jan. 16, 2024

(54) METHOD, DEVICE, AND MEDIUM FOR CONTROLLING TRAFFIC OF NETWORK BRANCH DEVICES

(71) Applicant: Huawei Technologies Co., Ltd., Shenzhen (CN)

(72) Inventor: Jianqiang Hou, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 51 days.

(21) Appl. No.: 17/488,543

(22) Filed: Sep. 29, 2021

(65) Prior Publication Data
US 2022/0103467 A1 Mar. 31, 2022

(30) Foreign Application Priority Data
Sep. 30, 2020 (CN) .......................... 202011066374.5

(51) Int. Cl.
*H04L 45/302* (2022.01)
*H04L 45/24* (2022.01)
*H04L 45/00* (2022.01)
*H04L 45/42* (2022.01)

(52) U.S. Cl.
CPC .......... *H04L 45/3065* (2013.01); *H04L 45/24* (2013.01); *H04L 45/38* (2013.01); *H04L 45/42* (2013.01)

(58) Field of Classification Search
CPC ..... H04L 45/24; H04L 45/3065; H04L 45/38; H04L 45/42
See application file for complete search history.

(56) References Cited

U.S. PATENT DOCUMENTS

| 8,339,959 | B1* | 12/2012 | Moisand | H04L 45/302 370/235 |
| 2006/0233181 | A1* | 10/2006 | Raszuk | H04L 45/04 370/401 |
| 2008/0080508 | A1* | 4/2008 | Das | H04L 45/00 370/392 |
| 2016/0036778 | A1 | 2/2016 | Chen et al. | |
| 2017/0208097 | A1 | 7/2017 | Kirby et al. | |
| 2020/0274799 | A1 | 8/2020 | Mishra et al. | |
| 2020/0366697 | A1* | 11/2020 | Vittal | H04L 41/22 |
| 2020/0396141 | A1* | 12/2020 | Sundararajan | H04L 45/42 |
| 2021/0067538 | A1* | 3/2021 | Mishra | H04L 63/1433 |
| 2021/0160175 | A1* | 5/2021 | Gupta | H04L 45/74 |
| 2021/0266262 | A1* | 8/2021 | Subramanian | H04L 45/38 |
| 2021/0392171 | A1* | 12/2021 | Srinivas | G06N 5/047 |

FOREIGN PATENT DOCUMENTS

WO 2020112448 A1 6/2020

* cited by examiner

*Primary Examiner* — Jeong S Park
(74) *Attorney, Agent, or Firm* — SLATER MATSIL, LLP

(57) ABSTRACT

A traffic control method including obtaining, by a network device, a configuration policy from a management device, where the configuration policy is used to control access between a plurality of branch devices, and where each of the plurality of branch devices is connected to the network device, and configuring, by the network device, a destination of traffic between the branch devices based on the configuration policy, so that the traffic between the branch devices is transmitted to the configured destination.

10 Claims, 14 Drawing Sheets

METHOD, DEVICE, AND MEDIUM FOR CONTROLLING TRAFFIC OF NETWORK BRANCH DEVICES

CROSS-REFERENCE TO RELATED APPLICATION

This application claims priority to Chinese Patent Application No. 202011066374.5, filed on Sep. 30, 2020, which is hereby incorporated by reference in its entirety.

TECHNICAL FIELD

This application relates to the field of electronic technologies, and in particular, to a traffic control method, a device, and a medium.

BACKGROUND

A software-defined wide area network (software-defined wide area network, SD-WAN) is an important practice of a concept and design idea of software-defined networking (SDN) in a wide area network (WAN). Through a software-defined method, the SD-WAN can provide a simple, intelligent, and flexible WAN interconnection capability, and help, in a trend of cloud-based enterprise services and Internet-based WAN connections, enterprises flexibly and conveniently obtain a high-quality wide area network anytime and anywhere.

Hub-spoke networking is a most common networking manner in SD-WAN deployment. As shown in FIG. 1, a data center (DC) at a headquarters of an enterprise may include at least one central device 101. Each central device 101 is used as a multi-port forwarder Hub. Each branch device 102 of the enterprise is connected to the central device 101. The branch device 102 and the central device communicate with each other. Branch devices 102 communicate with each other through the central device as required. This manner applies to a service scenario in which all branch devices 102 of the enterprise need to communicate with each other through the headquarters for unified security monitoring.

Different enterprise customers have different requirements on a traffic model for mutual access between branches. For example, financial and government customers usually require clearly that branches are allowed only to communicate with a headquarters and disallowed to communicate with each other for security considerations. However, in the current technology, traffic of mutual access between branches cannot be effectively controlled.

Therefore, the foregoing problem existing in the current technology needs to be mitigated.

SUMMARY

Embodiments of this application provide a traffic control method, a device, and a medium, to resolve a problem of managing mutual traffic access between branch devices.

In view of this, a first aspect of the embodiments of this application provides a traffic control method. The method includes: A network device obtains a configuration policy from a management device, where the configuration policy is used to control traffic access between a plurality of branch devices, and each of the plurality of branch devices is connected to the network device. The network device configures a destination of traffic between the branch devices based on the configuration policy, so that the traffic between the branch devices is transmitted to the configured destination.

In this embodiment, the management device sends the configuration policy to the network device, and the configuration policy is used to control traffic access between the plurality of branch devices, so that the network device can configure the destination of the traffic between the branch devices based on the configuration policy, and the traffic between the branch devices is transmitted to the configured destination, to control the traffic between the branch devices, thereby managing traffic access between the branch devices, for example, forbidding mutual access between the branch devices.

Optionally, that a network device obtains a configuration policy from a management device includes: The network device obtains a redirection policy from the management device, where the redirection policy is used to control traffic redirection. That the network device configures a destination of traffic between the branch devices based on the configuration policy includes: The network device redirects access traffic of a target branch device to a filtering device based on the redirection policy, where the target branch device is one of the plurality of branch devices, and the filtering device is configured to control mutual access permission between the plurality of branch devices and/or mutual access permission between the network device and the plurality of branch devices based on an access control policy.

In this embodiment, the network device may be a central device in a system, and the filtering device is configured to control the mutual access permission between the plurality of branch devices and/or the mutual access permission between the central device and the plurality of branch devices based on the access control policy. In this way, the filtering device can filter the access traffic of the target branch device, and for an access request beyond access, the filtering device filters out traffic corresponding to the access request, to control access of the target device.

Optionally, the access control policy includes forbidding traffic access of the target branch device to all or some other branch devices connected to the network device.

In this embodiment, the access control policy includes forbidding traffic access of the target branch device to all or some other branch devices connected to the network device, thereby forbidding mutual access between the branch devices.

Optionally, after the network device redirects the access traffic of the target branch device to the filtering device based on the redirection policy, the method further includes: The network device obtains return traffic from the filtering device, where the return traffic is traffic fed back by a local area network LAN device after the LAN device obtains the access traffic of the target branch device, the LAN device is configured to provide a network service to the target branch device, and the return traffic is filtered by the filtering device. The network device sends the return traffic to the target branch device.

In this embodiment, after sending the access traffic, the target branch device obtains the return traffic fed back by the LAN device, thereby implementing access to a local area network. In addition, because both the access traffic and the return traffic are filtered by the filtering device, the target branch device can access only the local area network rather than other branch devices. In this way, mutual access between the branch devices is forbidden.

Optionally, the filtering device is connected in series between the network device and the LAN device. The filtering device is configured to filter, based on the access control policy, traffic transmitted between the network device and the LAN device.

In this embodiment, the filtering device is connected in series between the central device and the LAN device, so that the access traffic and the return traffic that are transmitted between the central device and the LAN device both need to pass through the filtering device, and the traffic can be filtered by using the access control policy in the filtering device. Permission is assigned to mutual access between the branch devices, so that mutual access between the branch devices can be effectively forbidden.

Optionally, the filtering device is deployed on the network device in bypass mode, the network device is directly connected to the LAN device, and after the network device redirects the access traffic of the target branch device to the filtering device based on the redirection policy, the method further includes: The network device obtains filtered traffic from the filtering device, where the filtered traffic is traffic obtained after the filtering device filters the access traffic of the target branch device. The network device sends the filtered traffic to the LAN device.

In this embodiment, to resolve a problem that a network architecture that has been deployed in an actual working process is not connected in series to a filtering device, the filtering device is deployed on the central device in bypass mode, and a redirection policy is set at a traffic ingress of the central device, so that the central device redirects access traffic to the filtering device, to control the traffic, thereby forbidding mutual traffic access between the branch devices.

Optionally, before the network device obtains the return traffic from the filtering device, the method further includes: The network device sends the return traffic to the filtering device based on the redirection policy, where the filtering device is configured to filter the return traffic and send filtered return traffic to the network device.

In this embodiment, to resolve a problem that a network architecture that has been deployed in an actual working process is not connected in series to a filtering device, the filtering device is deployed on the central device in bypass mode, and a redirection policy is set at a traffic egress of the central device, so that the central device redirects return traffic to the filtering device, to control the traffic, thereby forbidding mutual traffic access between the branch devices.

Optionally, there are a plurality of filtering devices, and the plurality of filtering devices include at least an active filtering device and a standby filtering device. That the network device redirects access traffic of a target branch device to a filtering device based on the redirection policy includes: The network device redirects the access traffic of the target branch device to the active filtering device based on the redirection policy. The method further includes: The network device redirects the access traffic of the target branch device to the standby filtering device based on the redirection policy when it is detected that the active filtering device works abnormally.

In this embodiment, to prevent the filtering device from working abnormally, the standby filtering device is disposed. When the management device detects that the filtering device that is working, namely, the active filtering device, works abnormally, the management device indicates, by sending the redirection policy, the central device to switch between the filtering devices, to ensure that when the active filtering device fails, the standby filtering device can ensure normal operation, thereby improving system stability.

Optionally, there are a plurality of network devices, the network devices include at least a first sub-network device and a second sub-network device, the first sub-network device is connected to the second sub-network device, the second sub-network device is a standby device, and the method further includes: The first sub-network device sends obtained traffic to the second sub-network device when the first sub-network device works abnormally.

In this embodiment, to prevent the central device from working abnormally, at least one standby central device is disposed in the system, and the standby central device is connected to the active central device. When the active central device works abnormally, obtained traffic is sent to the standby central device, so that the entire system can still work normally.

Optionally, that a network device obtains a configuration policy from a management device includes: The network device obtains a route configuration policy from the management device, where the route configuration policy is used to filter access traffic between the branch devices. That the network device configures a destination of traffic between the branch devices based on the configuration policy includes: The network device sets a routing address of mutual access between the branch devices to a routing black hole based on the route configuration policy.

In this embodiment, the network device is a route reflector disposed between a central device and the branch devices, the plurality of branch devices are connected to the same central device, and the route reflector is configured to perform routing address reflection and exchange between the plurality of branch devices and between the central device and the plurality of branch devices. When the route reflector obtains the route configuration policy sent by the management device, the route reflector executes the policy, to set a routing address of mutual access between the plurality of branch devices to a routing black hole (NULL). When the branch devices need mutual traffic access, because an address of a next hop is null NULL, the branch devices cannot access each other. In this way, access between the branch devices is forbidden.

A second aspect of the embodiments of this application provides a traffic control method. The method includes: A network device obtains access traffic from a plurality of branch devices. The network device controls the access traffic between the plurality of branch devices to be transmitted to a destination configured in a configuration policy, where the configuration policy is a policy in the network device.

Optionally, the network device is a central device, and the configuration policy is a redirection policy. That a network device obtains access traffic from a plurality of branch devices includes: The network device receives access traffic from a target branch device, where the target branch device is one of the plurality of branch devices. That the network device controls the access traffic between the plurality of branch devices to be transmitted to a destination configured in a configuration policy includes: The network device redirects the access traffic of the target branch device to the filtering device based on the redirection policy, where the filtering device is configured to control mutual access permission between the plurality of branch devices and/or mutual access permission between the network device and the plurality of branch devices based on an access control policy.

Optionally, after the network device redirects the access traffic of the target branch device to the filtering device based on the redirection policy, the method further includes: The network device obtains return traffic from the filtering device, where the return traffic is traffic fed back by a local area network LAN device after the LAN device obtains the access traffic of the target branch device, the LAN device is configured to provide a network service to the target branch device, and the return traffic is filtered by the filtering device. The network device sends the return traffic to the target branch device.

Optionally, the network device is a route reflector, and the configuration policy is a route configuration policy. That the network device controls the access traffic between the plurality of branch devices to be transmitted to a destination configured in a configuration policy includes: The network device sets a routing address of mutual access between the branch devices to a routing black hole based on the route configuration policy.

A third aspect of the embodiments of this application provides a network device. The device includes an obtaining unit, configured to obtain a configuration policy from a management device, where the configuration policy is used to control access between a plurality of branch devices, and each of the plurality of branch devices is connected to the network device, and a configuration unit, configured to configure a destination of traffic between the branch devices based on the configuration policy obtained by the obtaining unit, so that the traffic between the branch devices is transmitted to the configured destination.

Optionally, the network device is a central device, and the obtaining unit is further configured to obtain a redirection policy from the management device, where the redirection policy is used to control traffic redirection.

The configuration unit is further configured to configure a destination of access traffic of the branch devices to a filtering device based on the redirection policy, where the filtering device is configured to control mutual access permission between the plurality of branch devices and/or mutual access permission between the network device and the plurality of branch devices based on an access control policy.

Optionally, the obtaining unit is further configured to receive access traffic from a target branch device, where the target branch device is one of the plurality of branch devices.

The device further includes an execution unit, configured to redirect the access traffic of the target branch device to the filtering device.

Optionally, the access control policy includes forbidding traffic access of the target branch device to all or some other branch devices connected to the network device.

Optionally, the obtaining unit is further configured to obtain return traffic from the filtering device, where the return traffic is traffic fed back by a local area network LAN device after the LAN device obtains the access traffic of the target branch device, the LAN device is configured to provide a network service to the target branch device, and the return traffic is filtered by the filtering device.

The device further includes an execution unit, configured to send the return traffic to the target branch device.

Optionally, the filtering device is connected in series between the network device and the LAN device. The filtering device is configured to filter, based on the access control policy, traffic transmitted between the network device and the LAN device.

Optionally, the filtering device is deployed on the network device in bypass mode, the network device is directly connected to the LAN device, and the obtaining unit is further configured to obtain filtered traffic from the filtering device, where the filtered traffic is traffic obtained after the filtering device filters the access traffic of the target branch device.

The execution unit is further configured to send the filtered traffic to the LAN device.

Optionally, the execution unit is further configured to send the return traffic to the filtering device based on the redirection policy, where the filtering device is configured to filter the return traffic and send filtered return traffic to the network device.

Optionally, there are a plurality of filtering devices, and the plurality of filtering devices include at least an active filtering device and a standby filtering device. The execution unit is further configured to: redirect the access traffic of the target branch device to the active filtering device based on the redirection policy. The execution unit is further configured to: redirect the access traffic of the target branch device to the standby filtering device based on the redirection policy when it is detected that the active filtering device works abnormally.

Optionally, there are a plurality of network devices, the network devices include at least a first sub-network device and a second sub-network device, the first sub-network device is connected to the second sub-network device, the second sub-network device is a standby device, and the execution unit is further configured to send obtained traffic to the second sub-network device when the first sub-network device works abnormally.

Optionally, the network device is a route reflector, and the obtaining unit is further configured to obtain a route configuration policy from the management device, where the route configuration policy is used to filter access traffic between the branch devices.

The configuration unit is further configured to set a routing address of mutual access between the branch devices to a routing black hole based on the route configuration policy.

A fourth aspect of the embodiments of this application provides a network device, including an obtaining unit, configured to obtain access traffic from a plurality of branch devices, and an execution unit, configured to control the access traffic between the plurality of branch devices that is obtained by the obtaining unit to be transmitted to a destination configured in a configuration policy, where the configuration policy is a policy in the network device.

Optionally, the network device is a central device, and the configuration policy is a redirection policy. The obtaining unit is further configured to receive access traffic from a target branch device, where the target branch device is one of the plurality of branch devices.

The execution unit is further configured to redirect the access traffic of the target branch device to the filtering device based on the redirection policy, where the filtering device is configured to control mutual access permission between the plurality of branch devices and/or mutual access permission between the network device and the plurality of branch devices based on an access control policy.

Optionally, the obtaining unit is further configured to obtain return traffic from the filtering device, where the return traffic is traffic fed back by a local area network LAN device after the LAN device obtains the access traffic of the target branch device, the LAN device is configured to provide a network service to the target branch device, and the return traffic is filtered by the filtering device.

The execution unit is further configured to send the return traffic to the target branch device.

Optionally, the network device is a route reflector, and the configuration policy is a route configuration policy. The execution unit is further configured to set a routing address of mutual access between the branch devices to a routing black hole based on the route configuration policy.

A fifth aspect of the embodiments of this application provides an electronic device. The electronic device includes: an interaction apparatus, an input/output (I/O) interface, a processor, and a memory. The memory stores program instructions.

The interaction apparatus is configured to obtain an operation instruction input by a user.

The processor is configured to execute the program instructions stored in the memory, to perform the method according to any one of the optional implementations of the first aspect or the second aspect.

A sixth aspect of the embodiments of this application provides a computer-readable storage medium, including instructions. When the instructions are run on a computer device, the computer device is enabled to perform the method according to any one of the optional implementations of the first aspect or the second aspect.

For beneficial effects of the second aspect to the sixth aspect of the embodiments of this application, refer to the descriptions of the first aspect. Details are not described herein again.

DETAILED DESCRIPTION OF ILLUSTRATIVE EMBODIMENTS

Embodiments of the present invention provide a traffic control method, a device, and a medium, to resolve a problem of managing mutual traffic access between branch devices.

To make a person skilled in the art understand the technical solutions in the present application better, the following clearly and completely describes the technical solutions in the embodiments of this application with reference to the accompanying drawings in the embodiments of this application. Apparently, the described embodiments are merely a part rather than all of the embodiments of this application. All other embodiments obtained by a person of ordinary skill in the art based on the embodiments of the present application without creative efforts shall fall within the protection scope of the present application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Different enterprise customers have different requirements on a traffic model for mutual access between branches. For example, financial and government customers usually require clearly that branches are allowed only to communicate with a headquarters and disallowed to communicate with each other for security considerations. Currently, traffic of mutual access between branches cannot be effectively controlled.

To resolve the foregoing problem, an embodiment of this application provides a traffic control method, to resolve a problem of managing mutual traffic access between branch devices.

Figure 2:
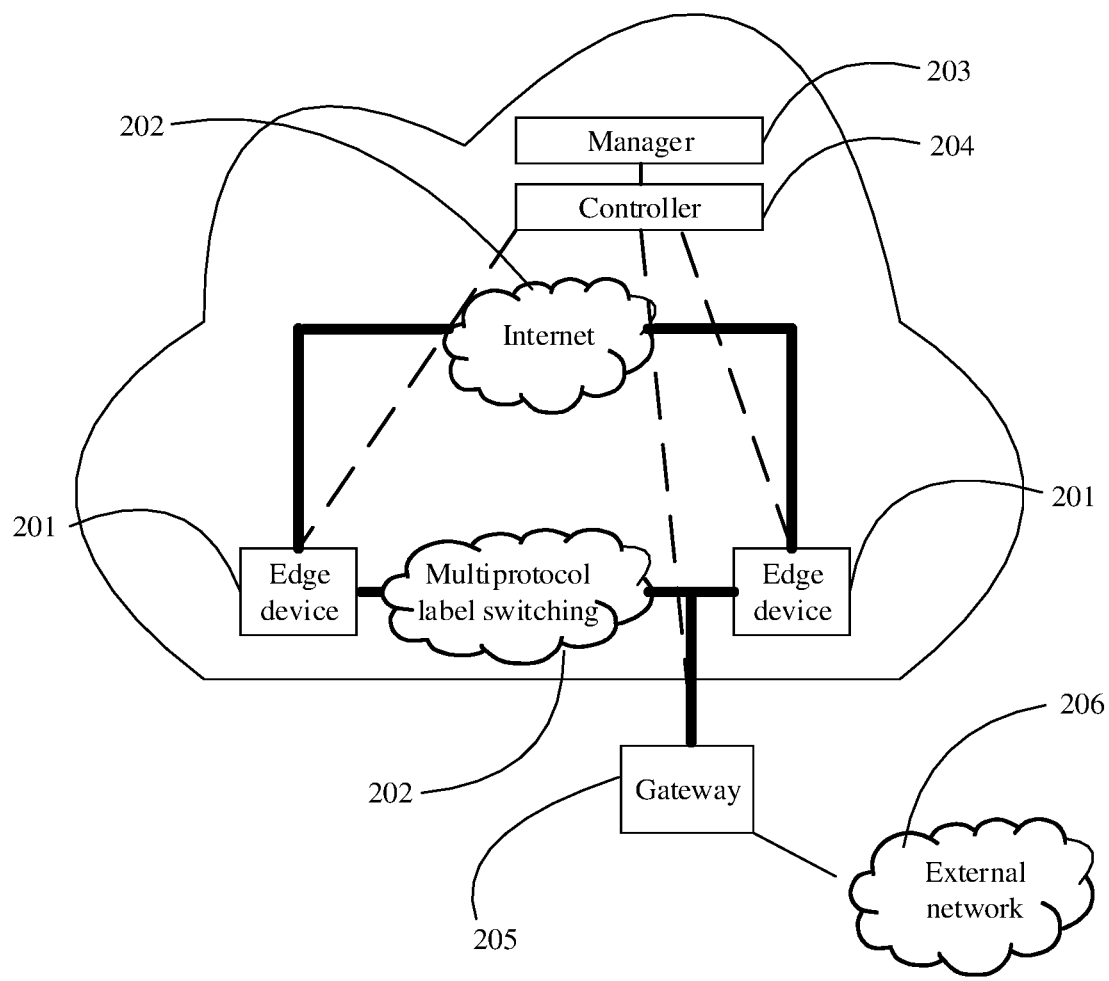
FIG. 2 is an SD-WAN architecture diagram of a traffic control method according to an embodiment of this application.

First, an SD-WAN architecture on which this embodiment of this application is based is described. As shown in FIG. 2, in an SD-WAN architecture, an SD-WAN edge device Edge 201 is deployed at an egress of a WAN network of an enterprise site. Edges 201 between a plurality of sites of an enterprise establish an SD-WAN overlay tunnel based on the WAN network 202 to implement mutual service access between the sites. Optionally, the WAN network 202 may be multiprotocol label switching (multiprotocol label switching, MPLS) or the Internet (Internet). An SD-WAN manager 203 and controller 204 are centrally deployed to implement centralized SD-WAN network management and control. An SD-WAN gateway (gate way, GW) 205 is deployed to implement mutual access between the WAN network and an external network ext network 206 in a cross-domain manner.

Figure 1:
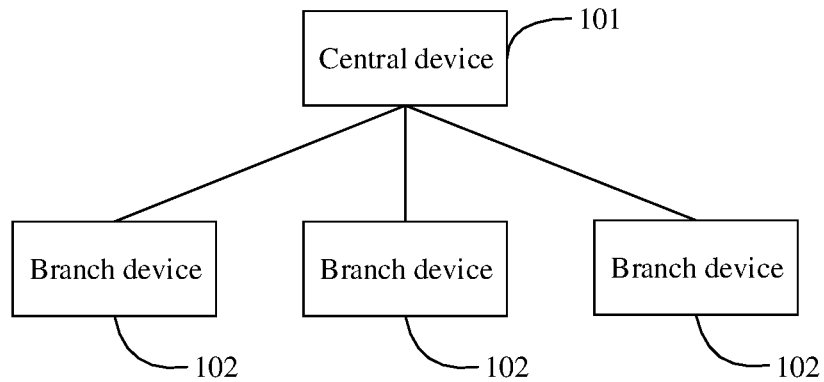
FIG. 1 is a system architecture diagram of a traffic control method according to an embodiment of this application.

Based on the SD-WAN architecture shown in FIG. 2, Hub-spoke networking is a most common networking manner in SD-WAN deployment. The edge device Edge 201 shown in FIG. 2 may be a central device in a data center (DC) of an enterprise headquarters shown in FIG. 1. Each central device 101 is used as a multi-port forwarder Hub, and may be separately connected to a plurality of branch devices 102. Each branch device 102 is a branch site. Each branch device 102 and the central device 101 communicate with each other. Branch devices 102 communicate with each other through the central device 101 as required. This manner applies to a service scenario in which all branch sites of the enterprise need to communicate with each other through the headquarters for unified security monitoring. It should be noted that, in the architecture of this application, the Hub and the central device refer to a same device. For ease of understanding, they are collectively referred to as a central device below.

Figure 3:
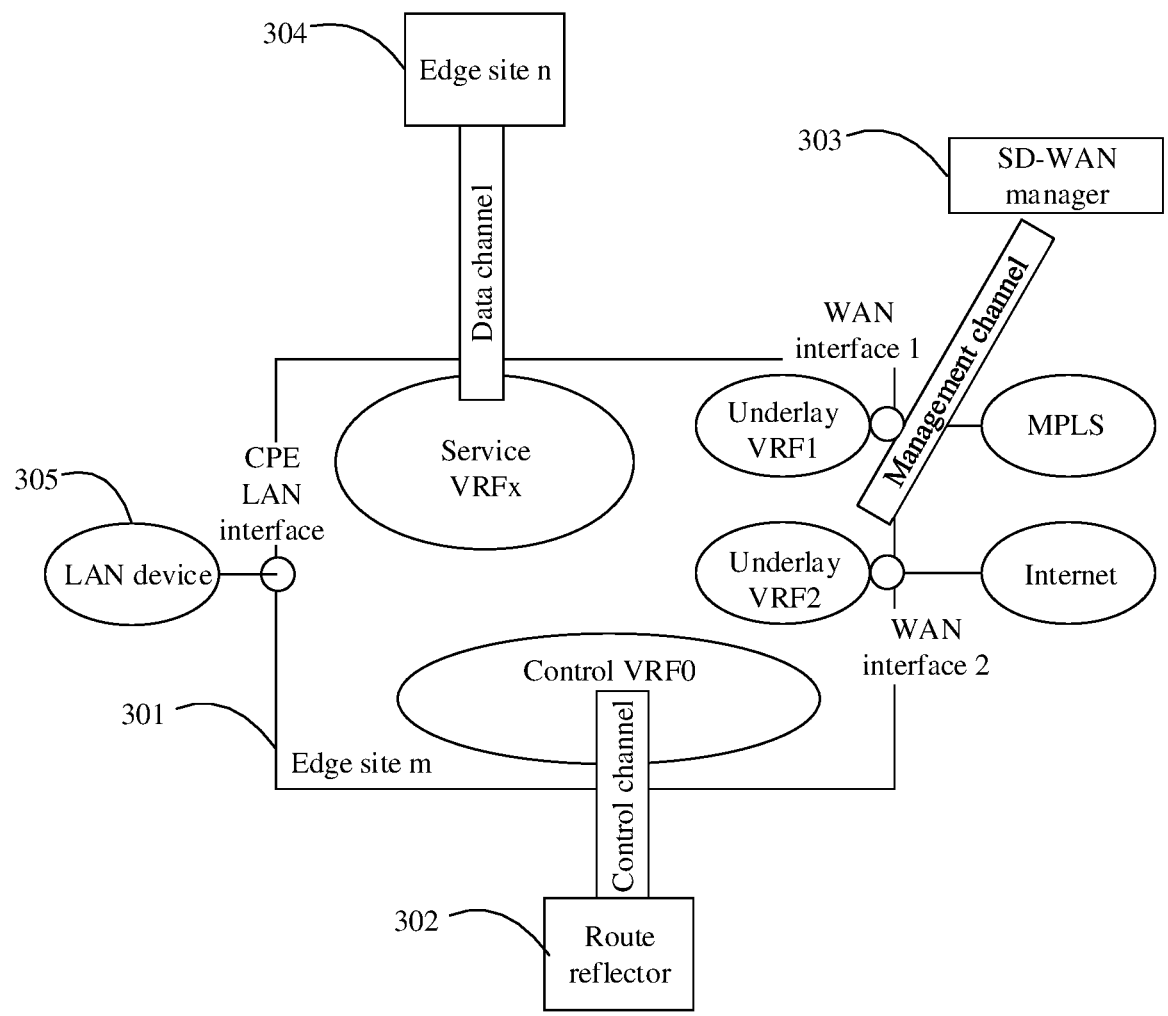
FIG. 3 is another system architecture diagram of a traffic control method according to an embodiment of this application.

Further, the edge device 201 shown in FIG. 2 may be specifically an SD-WAN edge site Edge m. A specific structure and a connection manner of the SD-WAN edge site Edge m 301 are shown in FIG. 3. The SD-WAN edge site Edge m 301 is separately connected to components such as an SD-WAN gateway (GW) (not shown in the figure), a route reflector (route reflector, RR) 302, and an SD-WAN manager 303. It should be noted that the SD-WAN GW is not mandatory in SD-WAN networking, and the architecture in this embodiment of this application may or may not include the GW component. The edge site m 301 is connected to a plurality of other edge sites n 304 by using a data channel. An overlay virtual routing forwarding overlay (VRF) and an underlay virtual routing forwarding underlay VRF are deployed on SD-WAN edge site customer premise equipment (CPE), to separate an underlay from an overlay. A site WAN interface is associated with the underlay VRF to implement reachability to an underlay of destination site CPE. A plurality of WAN interfaces may be in a same underlay VRF or different underlay VRFs. As shown in FIG. 3, two WAN interfaces are respectively connected to an underlay VRF1 and an underlay VRF2. A site CPE LAN interface is associated with the overlay VRF. The edge site m 301 is connected to a LAN device 305 by using the CPE LAN interface, to obtain a network service. An SD-WAN tunnel is established between the overlay VRF and an overlay VRF of a peer SD-WAN site to implement mutual service access. There may be one or more overlay VRFs based on a service requirement.

Figure 4:
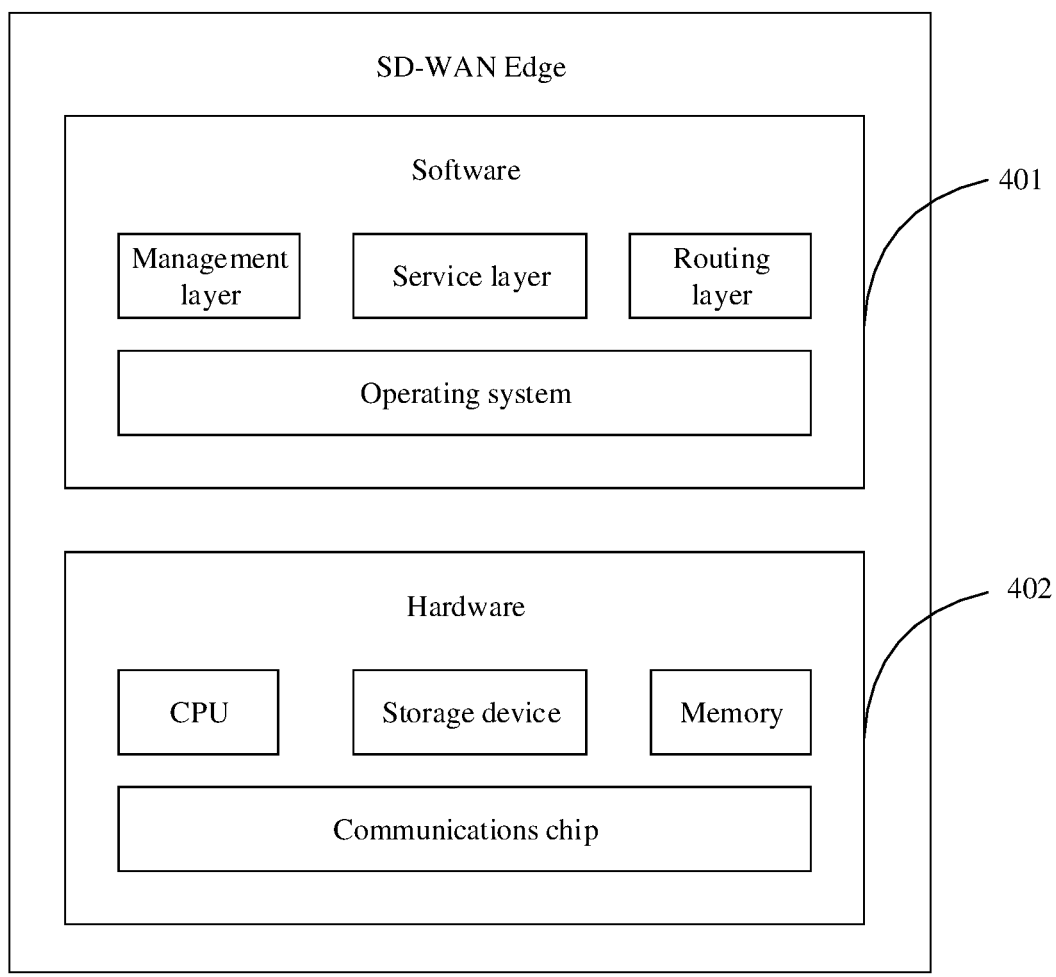
FIG. 4 is an architectural diagram of an edge device in a traffic control method according to an embodiment of this application.

Optionally, for a hardware structure of the SD-WAN Edge, refer to FIG. 4. As shown in FIG. 4, the SD-WAN Edge includes a hardware structure 401 and a software structure 402. The hardware structure includes a communications chip, a CPU, a memory, and a storage device. The software structure includes an operating system, a management layer, a routing layer, and a service layer.

The CPU specifically includes a processor. The processor is coupled to the storage device. The storage device is configured to store a program or instructions. When the program or the instructions are executed by the processor, the processor is enabled to implement a method stored in the software structure, and communicates with other hardware by using the communications chip. In the software structure, a communication method is executed by using structures of the operating system, the management layer, the routing layer, and the service layer. A specific software structure is in the current technology, and details are not described herein.

Based on the foregoing architecture, the traffic control method provided in this embodiment of this application is described below in detail with reference to accompanying drawings.

Figure 5A:
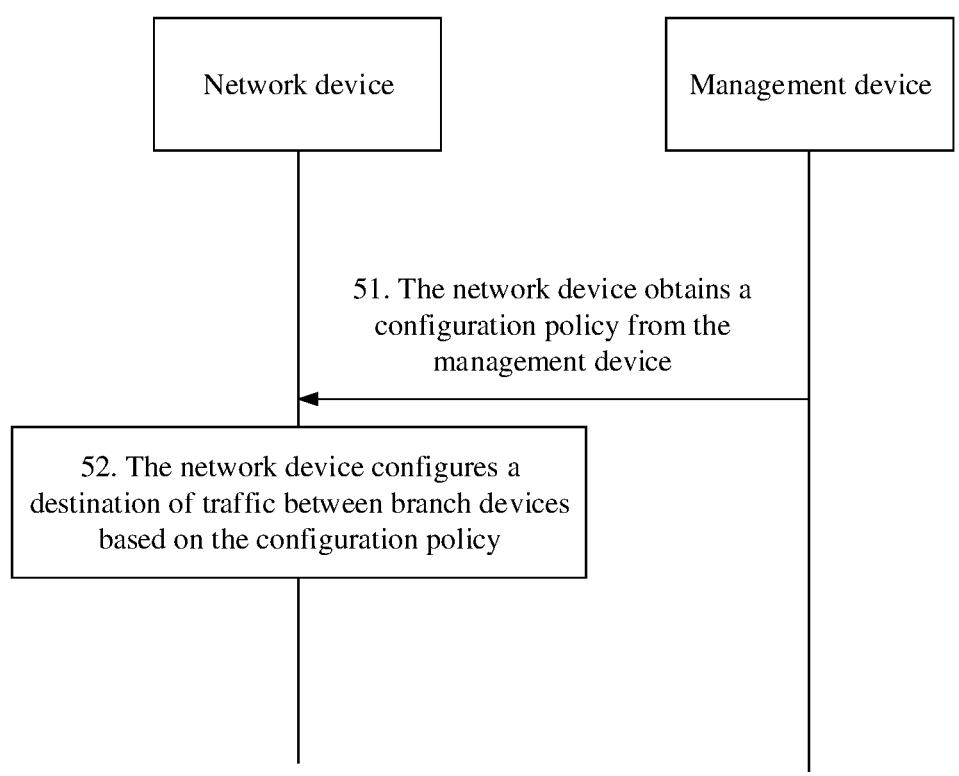
FIG. 5a is a schematic diagram of an embodiment of a traffic control method according to an embodiment of this application.

As shown in FIG. 5a, the traffic control method provided in this embodiment of this application includes the following steps.

51. A network device obtains a configuration policy from a management device.

In this embodiment, the configuration policy is used to control traffic access between a plurality of branch devices, and each of the plurality of branch devices is connected to the network device.

52. The network device configures a destination of traffic between the branch devices based on the configuration policy.

In this embodiment, the network device configures the destination of the traffic between the branch devices based on the configuration policy, so that the traffic between the branch devices is transmitted to the configured destination.

In this embodiment, the management device sends the configuration policy to the network device, and the configuration policy is used to control traffic access between the plurality of branch devices, so that the network device can configure the destination of the traffic between the branch devices based on the configuration policy, and the traffic between the branch devices is transmitted to the configured destination, to control the traffic between the branch devices, thereby managing traffic access between the branch devices, for example, forbidding mutual access between the branch devices.

Optionally, after the configuration policy is obtained in the manner of step 51, the network device specifically configures the destination of the traffic between the branch devices by performing the following steps.

1. The network device obtains access traffic from the plurality of branch devices.

In this embodiment, each of the plurality of branch devices is connected to the network device, and the network device can obtain the access traffic of the branch devices.

2. The network device controls the access traffic between the plurality of branch devices to be transmitted to a destination configured in a configuration policy.

In this embodiment, the configuration policy is the foregoing policy obtained by the network device. In this manner, after the policy is configured, the network device uses the policy.

It should be noted that the network device may have two specific implementations: 1. The network device is a central device, that is, the central device 101 shown in FIG. 1. The branch devices access a local area network LAN device by using the central device, to obtain a local area network service. Alternatively, the branch devices may access other branch devices by using the central device. Therefore, access of the branch devices may be managed by using the central device. 2. The network device is a route reflector (route reflector, RR). The route reflector is a centralized control plane of a network, and routes between all the branch devices are reflected and exchanged by using the route reflector. Therefore, access of the branch devices may be managed by using the route reflector. For ease of understanding, the following separately describes the two cases in detail.

1. The network device is a central device.

In this embodiment, the branch devices access the local area network (LAN) device by using the central device.

Figure 5B:
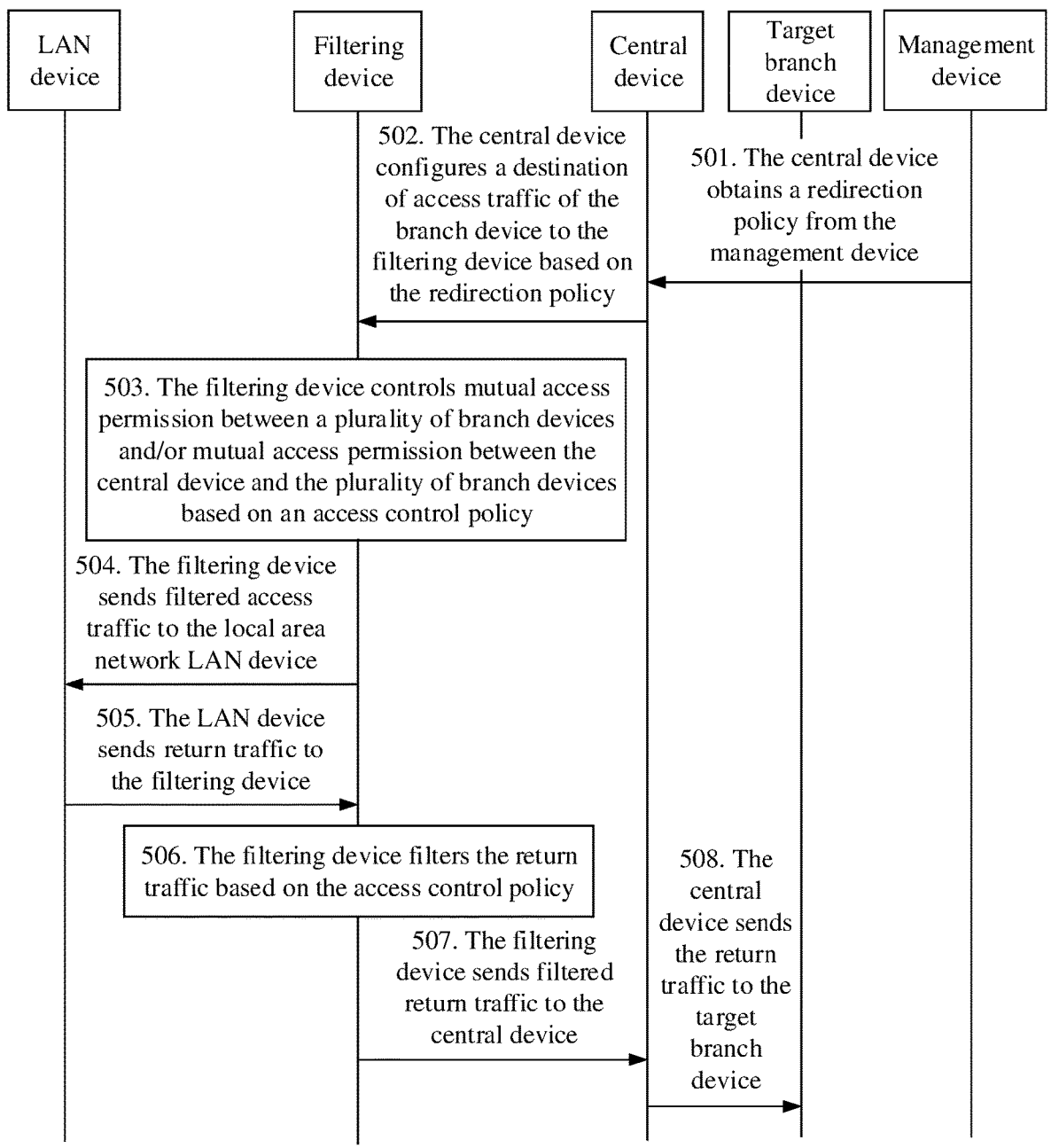
FIG. 5b is a schematic diagram of another embodiment of a traffic control method according to an embodiment of this application.

As shown in FIG. 5b, Embodiment 1 of the traffic control method provided in this embodiment of this application includes the following steps.

501. A central device obtains a redirection policy from a management device.

In this embodiment, the management device is a management node in a network architecture, and may be specifically the manager 203 shown in FIG. 2. The management device generates the redirection policy and sends the redirection policy to the central device. The redirection policy is used to control traffic redirection. Optionally, the redirection policy may be specifically a policy-based routing (PBR) policy.

502. The central device configures a destination of access traffic of a target branch device to a filtering device based on the redirection policy.

In this embodiment, the target branch device is one of a plurality of branch devices. In a specific working process, a management device side is generally controlled by an operator, and the management device delivers the redirection policy to the central device, so that the central device redirects access traffic of the target branch device to the filtering device based on the redirection policy. An access control policy in the filtering device is configured by a user side. In other words, the operator assigns the user side permission to set the access control policy.

503. The filtering device controls mutual access permission between the plurality of branch devices and/or mutual access permission between the central device and the plurality of branch devices based on the access control policy.

The filtering device is configured to control the mutual access permission between the plurality of branch devices and/or the mutual access permission between the central device and the plurality of branch devices based on the access control policy. In this way, the filtering device can filter access of the target device, and for an access request beyond permission, the filtering device filters out traffic corresponding to the access request, to control access of the target device.

Optionally, the access control policy includes forbidding traffic access of the target branch device to all or some other branch devices connected to the central device, thereby forbidding mutual access between branch devices. The access control policy may be an access control list (ACL) policy. The access control policy is used to configure the mutual access permission between the branch devices and/or the mutual access permission between the central device and the branch devices. Even though the plurality of branch devices are connected to the same central device for centralized network access, the filtering device can still forbid mutual access between the branch devices based on the access control policy.

504. The filtering device sends filtered access traffic to a local area network LAN device.

In this embodiment, the filtering device filters the access traffic of the target branch device and sends the filtered access traffic to the local area network LAN device. As shown in FIG. 3, the LAN device is connected to the central device by using a CPE LAN interface, to provide a network service to the target branch device, so that the branch device can access a local area network.

505. The LAN device sends return traffic to the filtering device.

In this embodiment, after obtaining the access traffic from the branch device, the LAN device feeds back the return traffic, so that the branch device accesses the local area network.

506. The filtering device filters the return traffic based on the access control policy.

In this embodiment, traffic also needs to be filtered on a return path to manage traffic access between branch devices, so as to prevent the branch device from obtaining access traffic from another branch device. This forbids mutual access between the branch devices.

507. The filtering device sends filtered return traffic to the central device.

In this embodiment, the filtering device sends the filtered return traffic to the central device. The return traffic obtained by the central device does not include traffic of another branch device.

508. The central device sends the return traffic to the target branch device.

In this embodiment, after sending the access traffic, the target branch device obtains the return traffic fed back by the LAN device, thereby implementing access to the local area network. In addition, because both the access traffic and the return traffic are filtered by the filtering device, the target branch device can access only the local area network rather than other branch devices. In this way, mutual access between the branch devices is forbidden.

In this embodiment, the filtering device may be a physical device or a virtual software program. For example, the filtering device may be a firewall device. Alternatively, the filtering device may be run in the central device as a virtual module. Regardless of whether the filtering device is a physical device or a virtual software program, a network administrator on a central device side configures access control policies for the filtering device. In an actual working process, the management device side is generally controlled by the operator, and the central device side is controlled by a user. In this working manner, the user configures access control policies on the filtering device based on an actual requirement of the user, so that a supplier that maintains the central device does not need to learn network planning on a branch device side, thereby reducing operation difficulty. In addition, in large-scale networking, as the number of branch devices increases, new access control policies are all deployed on the filtering device, thereby reducing load on the central device.

It should be noted that in the foregoing method, the filtering device may be connected to the central device in the following two different manners.

(1) The filtering device is deployed in series between the central device and the local area network LAN device. As shown in FIG. 3, the LAN device is connected to the central device by using the CPE LAN interface, to provide the network service to the target branch device, so that the branch device can access the local area network. In this manner, the filtering device is connected in series between the central device and the LAN device, so that access traffic may pass through the central device, the filtering device, and the LAN device in sequence. For the access traffic, the central device sends the access traffic to the filtering device, and the filtering device filters the access traffic and sends filtered access traffic to the LAN device. For return traffic, after obtaining the return traffic fed back by the LAN device, the filtering device filters the return traffic and sends filtered return traffic to the central device.

(2) The filtering device is deployed on the central device in bypass mode. In this manner, the filtering device is deployed on the central device in bypass mode, and the central device is directly connected to the LAN device. For access traffic, the central device sends the obtained access traffic to the filtering device based on the redirection policy, the filtering device filters the access traffic and feeds back filtered access traffic to the central device, and then the central device sends the filtered access traffic to the LAN device. For return traffic, after obtaining the return traffic from the LAN device, the central device sends the return traffic to the filtering device based on the redirection policy, and the filtering device filters the return traffic and feeds back filtered return traffic to the central device.

For ease of understanding, the following describes the foregoing two cases in detail with reference to accompanying drawings.

(1) The filtering device is deployed in series between the central device and the LAN device.

Figure 6A:
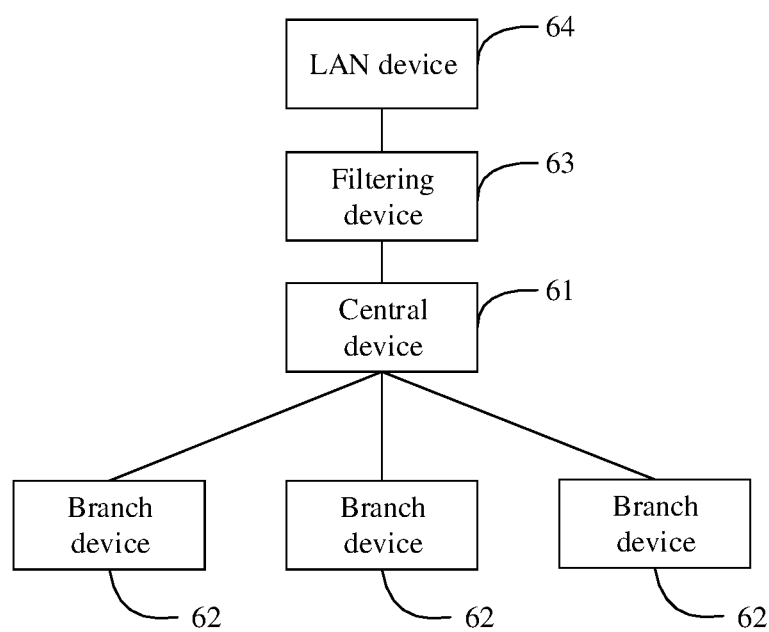
FIG. 6a is another system architecture diagram of a traffic control method according to an embodiment of this application.
Figure 6B:
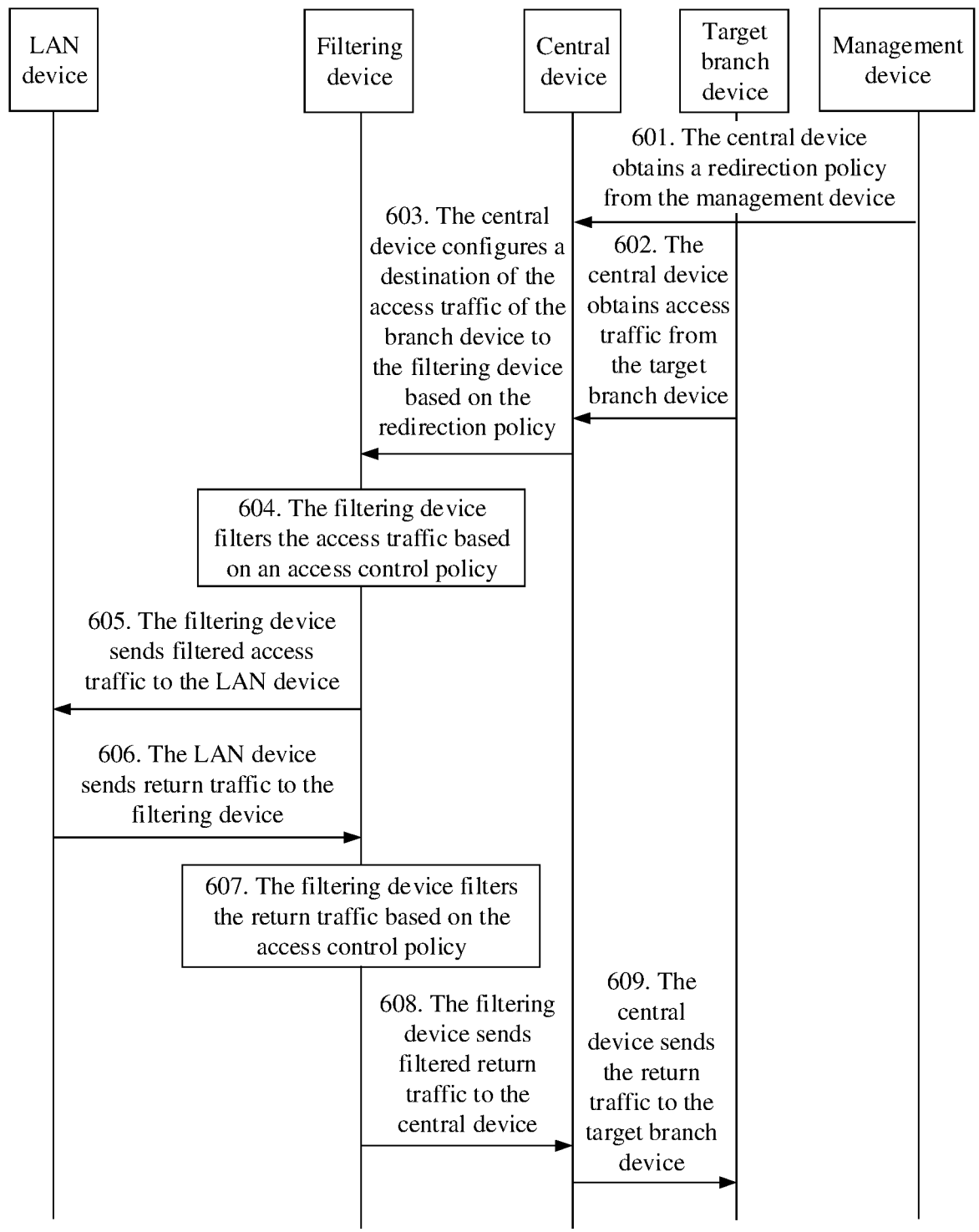
FIG. 6b is a schematic diagram of another embodiment of a traffic control method according to an embodiment of this application.

In this embodiment, for an architecture of serial deployment, refer to FIG. 6a. As shown in FIG. 6a, each of a plurality of branch devices 62 is connected to a central device 61, the central device 61 is connected to a filtering device 63, and the filtering device 63 is connected to a LAN device 64, thereby implementing serial deployment of the filtering device 63. Based on the architecture shown in FIG. 6a, Embodiment 2 of the traffic control method provided in this embodiment of this application includes steps shown in FIG. 6b.

601. The central device obtains a redirection policy from a management device.

In this embodiment, for this step, refer to step 501. Details are not described herein again.

602. The central device obtains access traffic from a target branch device.

In this embodiment, the target branch device sends the access traffic to the central device, to start access to a local area network.

603. The central device redirects the access traffic of the target branch device to a filtering device based on the redirection policy.

In this embodiment, the filtering device is connected to the central device, and the central device sends the access traffic to the filtering device. For a specific implementation, refer to step 502. Details are not described herein again.

604. The filtering device filters the access traffic based on an access control policy.

In this embodiment, for this step, refer to step 503. Details are not described herein again.

605. The filtering device sends filtered access traffic to the LAN device.

In this embodiment, because the filtering device is connected in series between the central device and the LAN device, after filtering the access traffic, the filtering device may send the filtered access traffic to the LAN device.

606. The LAN device sends return traffic to the filtering device.

In this embodiment, after obtaining the access traffic from the branch device, the LAN device feeds back the return traffic, so that the branch device accesses the local area network.

607. The filtering device filters the return traffic based on the access control policy.

In this embodiment, for this step, refer to step 506. Details are not described herein again.

608. The filtering device sends filtered return traffic to the central device.

In this embodiment, because the filtering device and the central device are connected in series, after filtering the return traffic, the filtering device directly sends the filtered return traffic to the central device.

609. The central device sends the return traffic to the target branch device.

In this embodiment, for this step, refer to step 508. Details are not described herein again.

In this embodiment, the filtering device is connected in series between the central device and the LAN device, so that the access traffic and the return traffic that are transmitted between the central device and the LAN device both need to pass through the filtering device, and the traffic can be filtered by using the access control policy in the filtering device. Permission is assigned to mutual access between branch devices, so that mutual access between the branch devices can be effectively forbidden.

It should be noted that, the foregoing deployment manner in which the filtering device is connected in series between the central device and the LAN device is a relatively ideal deployment manner to adapt to the method provided in this application. However, in an actual working process, in some network architectures that have been deployed, a central device is directly connected to a LAN device without a filtering device connected in series. In this case, relatively high costs are required to reconstruct an existing architecture. To overcome this problem, this embodiment of this application provides a second solution, that is, the filtering device is deployed on the central device in bypass mode, so that the network architecture does not need to be additionally reconstructed to implement the method provided in this embodiment of this application. For ease of understanding, the following describes this case in detail with reference to accompanying drawings.

(2) The filtering device is deployed on the central device in bypass mode.

Figure 7A:
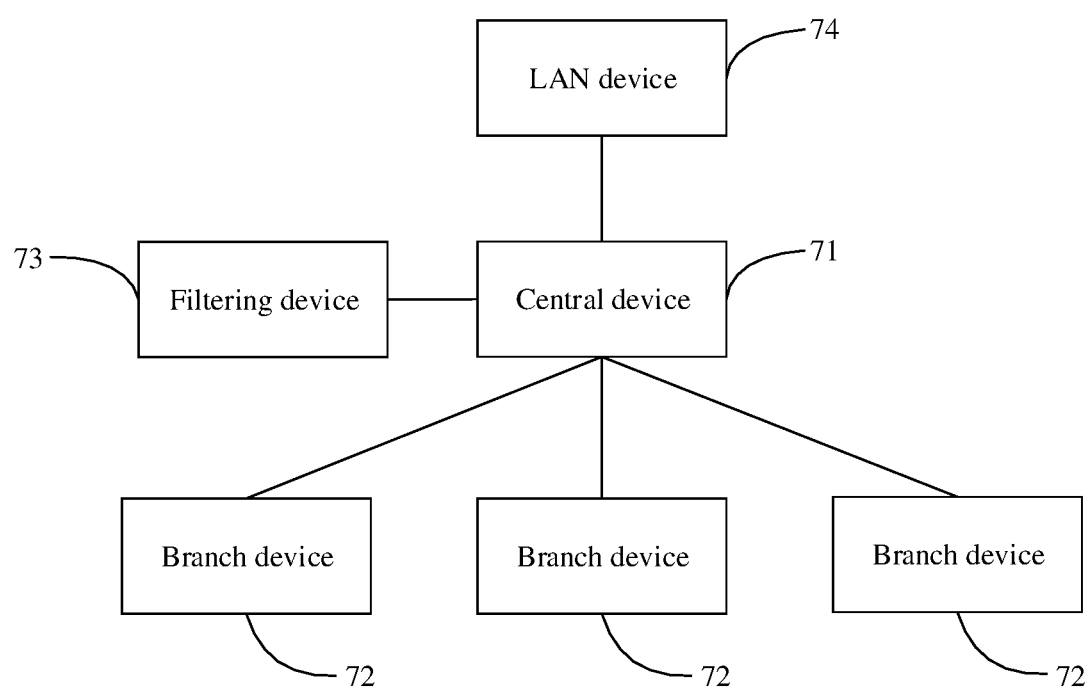
FIG. 7a is another system architecture diagram of a traffic control method according to an embodiment of this application.
Figure 7B:
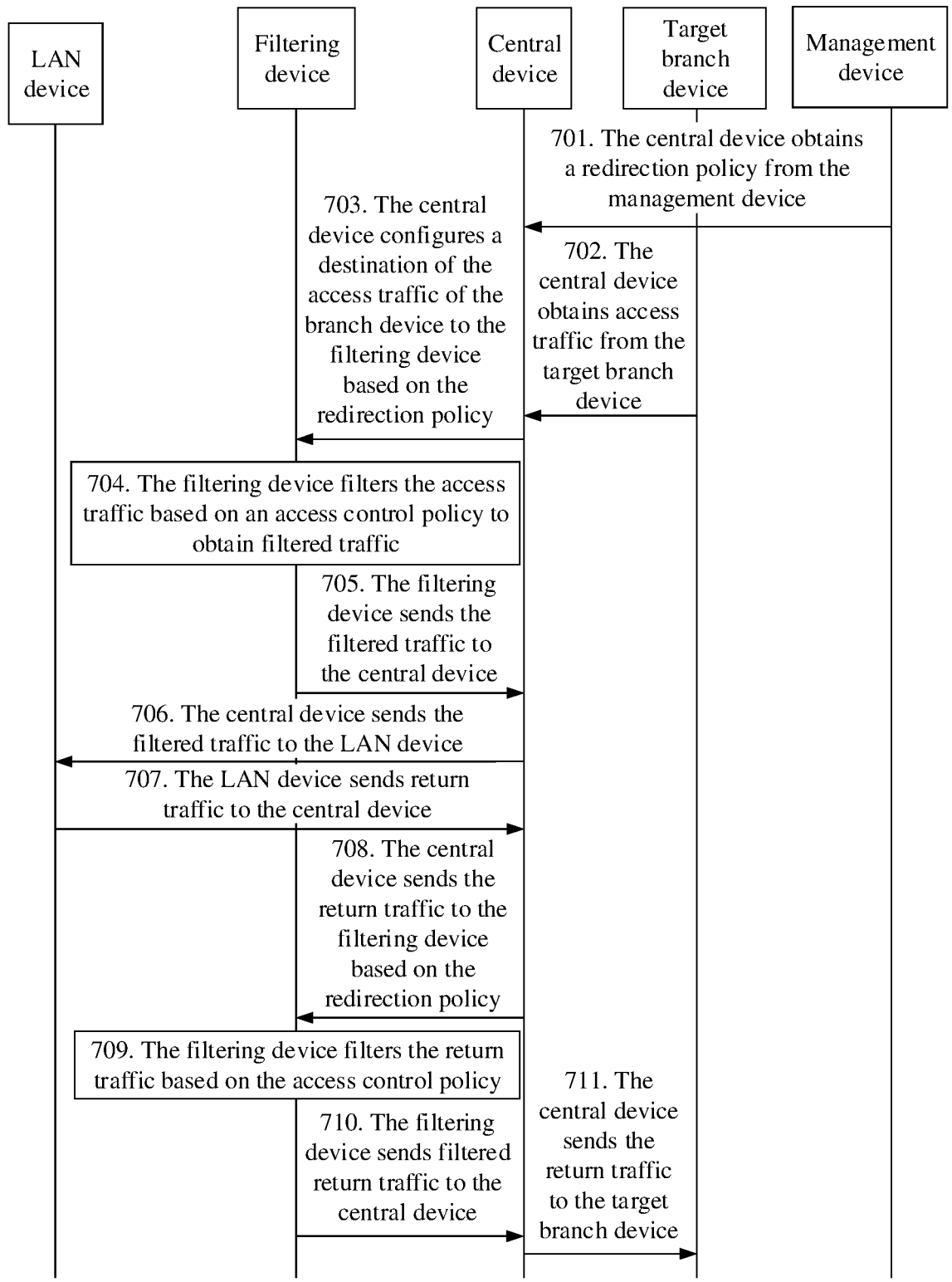
FIG. 7b is a schematic diagram of another embodiment of a traffic control method according to an embodiment of this application.

In this embodiment, for an architecture of bypass deployment, refer to FIG. 7a. As shown in FIG. 7a, each of a plurality of branch devices 72 is connected to a central device 71, the central device 71 is directly connected to a LAN device 74, and a filtering device 73 is connected to the central device 71, thereby implementing bypass deployment of the filtering device 73 on the central device 71. Based on the architecture shown in FIG. 7a, Embodiment 3 of the traffic control method provided in this embodiment of this application includes steps shown in FIG. 7b.

701. The central device obtains a redirection policy from a management device.

In this embodiment, the redirection policy obtained by the central device from the management device includes two parts: one part is a redirection policy for redirecting access traffic of a branch device to the filtering device, and the other part is a redirection policy for redirecting, to the filtering device, return traffic sent by the LAN device.

702. The central device obtains access traffic from a target branch device.

In this embodiment, the target branch device sends the access traffic to the central device, to start access to a local area network.

703. The central device redirects the access traffic of the target branch device to the filtering device based on the redirection policy.

In this embodiment, the filtering device is deployed on the central device in bypass mode, and the central device sends the access traffic to the filtering device. For a specific implementation, refer to step 502. Details are not described herein again.

704. The filtering device filters the access traffic based on an access control policy to obtain filtered traffic.

In this embodiment, the filtered traffic is traffic obtained after the filtering device filters the access traffic of the target branch device. For this step, refer to step 503. Details are not described herein again.

705. The filtering device sends the filtered traffic to the central device.

In this embodiment, because the filtering device is deployed on the central device in bypass mode and is not connected to the LAN device, the filtering device cannot directly send the filtered traffic to the LAN device, but can send the filtered traffic only to the central device, and the central device forwards the filtered traffic to the LAN device.

706. The central device sends the filtered traffic to the LAN device.

In this embodiment, the filtered traffic obtained by the central device is traffic that has been filtered, and the central device may directly send the filtered traffic to a next-hop node, namely, the LAN device, after querying a table.

707. The LAN device sends return traffic to the central device.

In this embodiment, after obtaining the access traffic from the branch device, the LAN device feeds back the return traffic, so that the branch device accesses the local area network.

708. The central device sends the return traffic to the filtering device based on the redirection policy.

In this embodiment, because the filtering device is deployed on the central device in bypass mode and is not connected to the LAN device, the LAN device cannot directly send the return traffic to the filtering device, but can send the return traffic only to the central device, and the central device forwards the return traffic to the filtering device.

709. The filtering device filters the return traffic based on the access control policy.

In this embodiment, for this step, refer to step 506. Details are not described herein again.

710. The filtering device sends filtered return traffic to the central device.

In this embodiment, the filtering device is deployed on the central device in bypass mode, and therefore may send the filtered return traffic to the central device.

711. The central device sends the return traffic to the target branch device.

In this embodiment, for this step, refer to step 508. Details are not described herein again.

In this embodiment, to resolve a problem that a network architecture that has been deployed in an actual working process is not connected in series to a filtering device, the filtering device is deployed on the central device in bypass mode, and redirection policies are respectively set at a traffic ingress and egress of the central device, so that the central device separately redirects the access traffic and the return traffic to the filtering device. The filtering device is connected to the central device in bypass mode, so that the access traffic and the return traffic can still be filtered without additionally reconstructing the network architecture, to control the traffic, thereby forbidding mutual traffic access between branch devices. In addition, the access control policy is executed by the filtering device, thereby reducing storage load of the central device, and the filtering device may be directly configured by a network administrator on a central device side, thereby reducing operation costs of an operator.

It should be noted that, in an actual working process, the filtering device runs access control policies. As the number of branch devices increases, the number of access control policies also increases correspondingly. Therefore, the filtering device may work abnormally. As a result, a path between the filtering device and the outside is disconnected, and traffic cannot be normally controlled. To resolve this problem, a standby filtering device may be disposed, so that when the filtering device that is working fails, the filtering device can be switched to the standby device in a timely manner to continue working, to ensure system stability. For ease of understanding, the following describes this case in detail with reference to accompanying drawings.

Figure 8A:
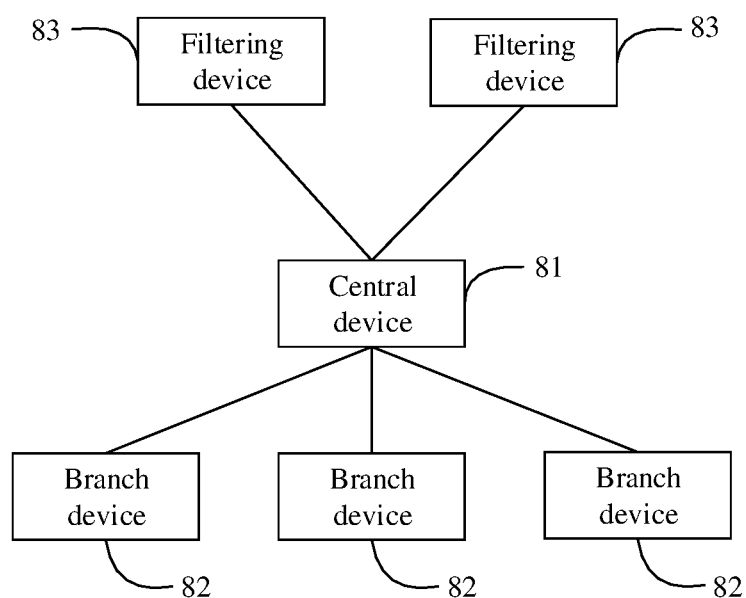
FIG. 8a is another system architecture diagram of a traffic control method according to an embodiment of this application.

As shown in FIG. 8*a*, in this case, a plurality of branch devices 82 are connected to a same central device 81, there are a plurality of filtering devices 83, and the plurality of filtering devices 83 include at least an active filtering device and a standby filtering device. The active filtering device is identical to the standby filtering device. The active filtering device is a device that is working, and the standby filtering device is a device in a dormant state. The active filtering device and the standby filtering device each may be connected in series between the central device 81 and a LAN device in the manner described in Embodiment 2, or may be deployed on the central device 81 in bypass mode shown in Embodiment 3. Alternatively, one device may be deployed in series, and the other device may be deployed in bypass mode. This is not limited in this embodiment of this application.

Figure 8B:
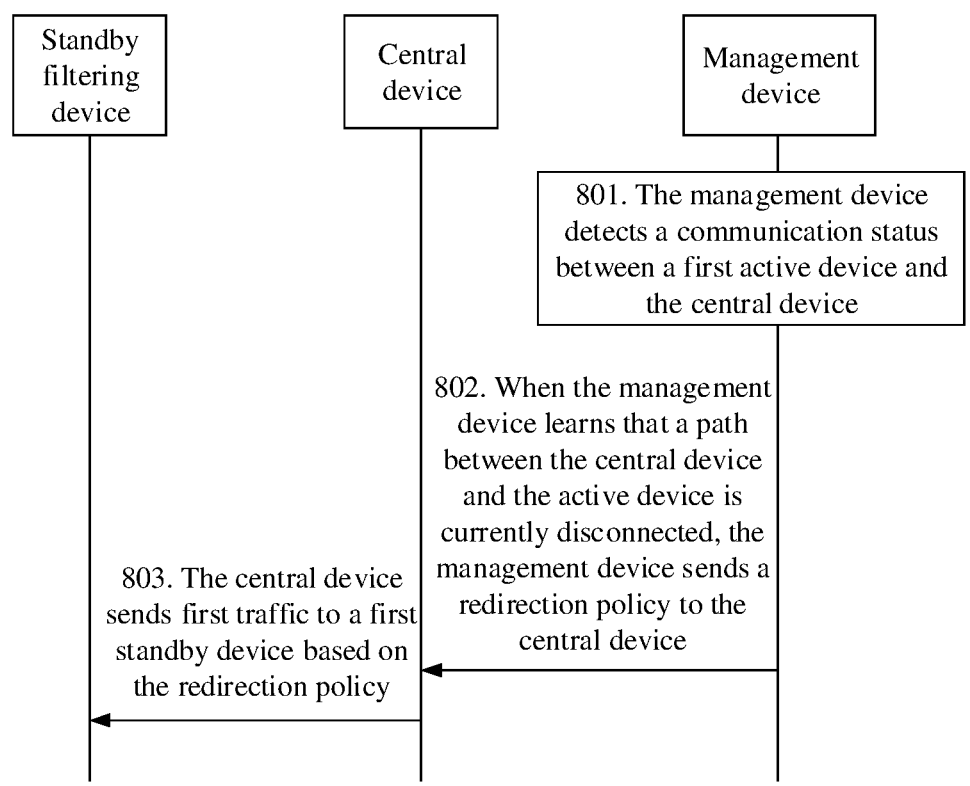
FIG. 8b is a schematic diagram of another embodiment of a traffic control method according to an embodiment of this application.

Based on the architecture shown in FIG. 8*a*, as shown in FIG. 8*b*, Embodiment 4 of the traffic control method provided in this embodiment of this application includes the following steps.

801. A management device detects a communication status between the active filtering device and the central device.

In this embodiment, the active filtering device is a filtering device that is performing the traffic control method in any one of Embodiments 1 to 3. Optionally, the management device may detect, through bidirectional forwarding detection (bidirectional forwarding detection, BFD) or network quality analysis (network quality analysis, NQA), an IP address, that is, a traffic status, between the active filtering device and the central device, to obtain a current communication status of a path between the active filtering device and the central device.

802. When the management device learns that the path between the central device and the active filtering device is currently disconnected, the management device sends a redirection policy to the central device.

In this embodiment, in the manner shown in step 801, when the management device detects that the path between the central device and the active filtering device is currently disconnected, it indicates that the active filtering device may be abnormal, and cannot work normally. In this case, the management device sends a redirection policy to the central device. The redirection policy may be specifically a policy-based routing (policy-based routing, PBR) policy. The redirection policy is used to indicate the central device to redirect access traffic from a branch device, and send the access traffic from the branch device to the standby filtering device.

803. The central device sends the access traffic of the branch device to the standby filtering device based on the redirection policy.

In this embodiment, the central device sends the access traffic from the branch device to the standby filtering device based on the redirection policy, so that when the active filtering device works abnormally, the active filtering device is switched to the filtering device, and the standby filtering device replaces the active filtering device to continue a traffic filtering operation.

It should be noted that, for a method for controlling return traffic in Embodiment 4 of this application, refer to related descriptions in the foregoing embodiment. Details are not described herein again.

In this embodiment, to prevent the filtering device from working abnormally, the standby filtering device is disposed. When the management device detects that the filtering device that is working, namely, the active filtering device, works abnormally, the management device indicates, by sending the redirection policy, the central device to switch between the filtering devices, to ensure that when the active filtering device fails, the standby filtering device can ensure normal operation, thereby improving system stability.

It should be noted that, in a specific working process, not only the filtering device but also the central device may work abnormally. In this case, if the central device is abnormal, a switched-to standby central device needs to replace the active central device in a timely manner, to ensure normal working of a system. The following describes this case in detail with reference to accompanying drawings.

Figure 9A:
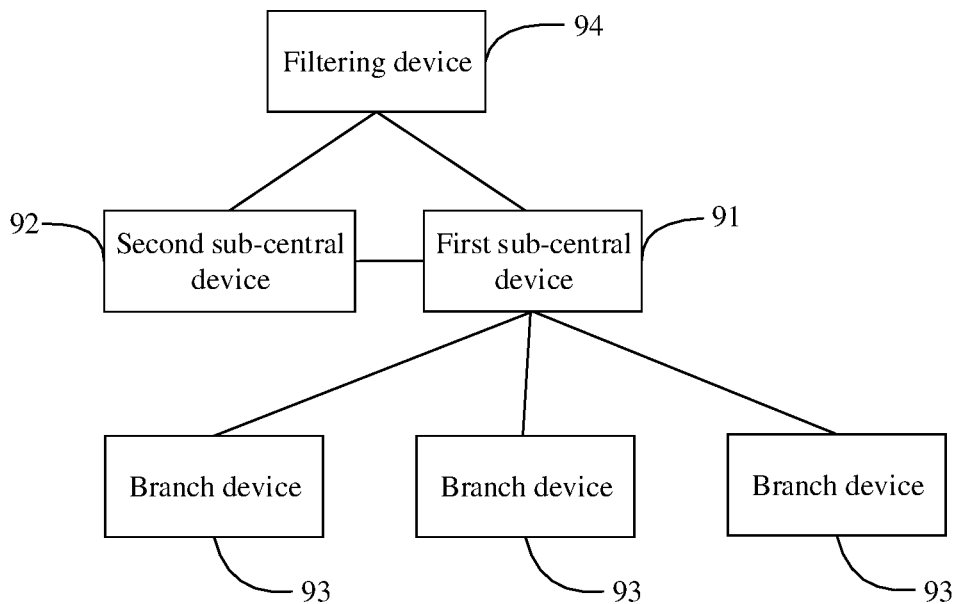
FIG. 9a is another system architecture diagram of a traffic control method according to an embodiment of this application.

As shown in FIG. 9a, based on Embodiments 1 to 4, this embodiment of this application further provides an architecture. In this case, there are a plurality of central devices, including at least a first sub-central device 91 and a second sub-central device 92. Structures of the first sub-central device 91 and the second sub-central device 92 are the same. The first sub-central device 91 is a central device that is working, and the second sub-central device 92 is a standby central device. The first sub-central device 91 is connected to the second sub-central device 92. The first sub-central device 91 is connected to a plurality of branch devices 93. Each of the first sub-central device 91 and the second sub-central device 92 is connected to a filtering device 94.

Optionally, a manner in which each of the first sub-central device and the second sub-central device is connected to the filtering device may be either serial deployment or bypass deployment. As shown in Embodiment 4, there may be a plurality of filtering devices. This is not limited in this embodiment of this application.

Figure 9B:
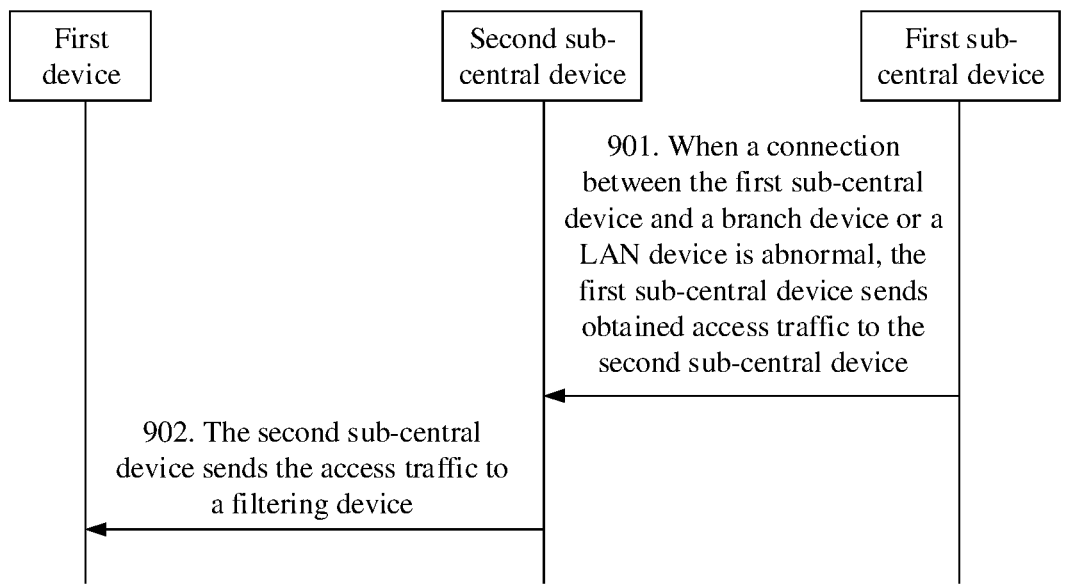
FIG. 9b is a schematic diagram of another embodiment of a traffic control method according to an embodiment of this application.

Based on the architecture shown in FIG. 9a, as shown in FIG. 9b, Embodiment 5 of the traffic control method provided in this embodiment of this application includes the following steps.

When the first sub-central device performs the method in any one of Embodiments 1 to 4 as a central device that is working, the following steps are performed.

901. When a connection between the first sub-central device and a branch device or a LAN device is abnormal, the first sub-central device sends obtained access traffic to the second sub-central device.

In this embodiment, the first sub-central device is connected to the second sub-central device, and when the first sub-central device detects, in a working process, that the first sub-central device works abnormally, the first sub-central device sends obtained traffic to the second sub-central device. Each of the first sub-central device and the second sub-central device is connected to the filtering device, and a connection manner may be the manner shown in either Embodiment 2 or Embodiment 3, so that after the second sub-central device obtains the traffic sent by the first sub-central device, based on the method shown in any one of Embodiments 1 to 4, the second sub-central device continues to perform the traffic control method as a central device.

902. The second sub-central device sends the access traffic to the filtering device.

In this embodiment, after obtaining the access traffic from the first sub-central device, the second sub-central device sends the first traffic to the filtering device, so that when the first sub-central device works abnormally, the second sub-central device as a standby can work normally, to ensure normal operation of a system.

In this embodiment, to prevent the central device from working abnormally, at least one standby central device is disposed in the system, and the standby central device is connected to the active central device. When the active central device works abnormally, the obtained traffic is sent to the standby central device, so that the entire system can still work normally.

Based on the methods provided in Embodiments 1 to 5, a filtering device is added to a network architecture, an access control policy is configured in the filtering device, and access traffic of a branch device is filtered by using the access control policy in the filtering device, thereby forbidding mutual traffic access between branch devices. In addition, the access control policy in the filtering device is configured by a user on a central device side, thereby reducing operation pressure. Optionally, this embodiment of this application further provides a traffic control method. No filtering device needs to be additionally disposed, and access between branch devices may be forbidden by configuring a route reflector. For ease of understanding, the following describes this case in detail with reference to accompanying drawings.

2. The network device is a route reflector.

In this embodiment, the route reflector is a centralized control plane of a network, and routes between all the branch devices are reflected and exchanged by using the route reflector. Therefore, access of the branch devices may be managed by using the route reflector.

Figure 10:
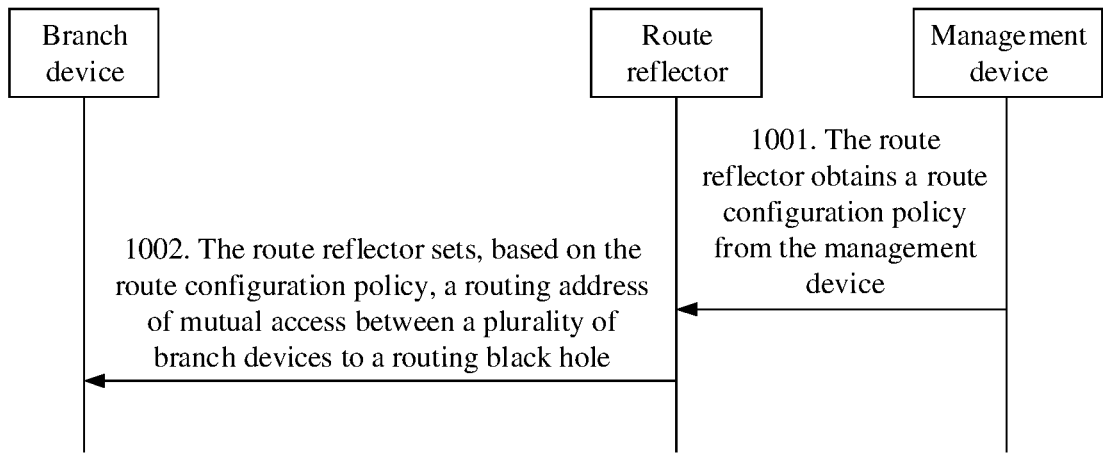
FIG. 10 is a schematic diagram of another embodiment of a traffic control method according to an embodiment of this application.

As shown in FIG. 10, Embodiment 6 of the traffic control method provided in this embodiment of this application includes the following steps.

1001. A route reflector obtains a route configuration policy from a management device.

In this embodiment, the route reflector (RR) is a centralized control plane of a network, and routes between all sites are reflected and exchanged by using the route reflector. The route configuration policy is a policy generated by the management device and sent to the route reflector. Optionally, the route configuration policy uses a border gateway protocol (BGP), and the route configuration policy is used to filter access traffic.

In a scenario of the present invention, to prevent mutual access between branch devices, a specific working manner of the route configuration policy is as follows: when the route reflector reflects a service route between branch devices, the route reflector changes a next hop to a routing black hole, that is, modifies an IP address of a next-hop site to null (NULL), so that the branch devices cannot access each other.

For example, a destination IP address of a target branch device is assigned by the route reflector. When the route reflector reflects a service route between the target branch device and a central device, the route reflector works normally, and allows a next-hop node of the target branch device to be the central device, so that the target branch device accesses the central device. When the route reflector reflects a service route between the target branch device and another branch device, the route reflector changes a next hop of the target branch device to null, so that the target branch device cannot access the another branch device, thereby forbidding mutual service access between the branch devices.

1002. The route reflector sets, based on the route configuration policy, a routing address of mutual access between a plurality of branch devices to a routing black hole.

In this embodiment, similar to the foregoing network architecture, a plurality of branch devices are connected to a same central device, and the route reflector is configured to perform routing address reflection and exchange between the plurality of branch devices and between the central device and the plurality of branch devices. When the route reflector obtains the route configuration policy sent by the management device, the route reflector executes the policy, to set a routing address of mutual access between the plurality of branch devices to a routing black hole (NULL). When branch devices need mutual traffic access, because an address of a next hop is null (NULL), the branch devices cannot access each other. In this way, access between the branch devices is forbidden.

Optionally, mutual access permission between any two nodes may be configured in the route configuration policy as required. For example, the route reflector may further set an address of mutual access between a branch device and the central device to a routing black hole based on the route configuration policy, so that the branch device loses permission to access the central device.

In this embodiment, compared with a solution in the current technology, the routing black hole is not directly configured on the branch device, but is uniformly configured on the route reflector. Therefore, the number of route configuration policies does not increase with the number of terminal devices. When the route reflector works, the route reflector marks each site, so that the route reflector can learn, based on marks, whether each site is the central device or a user device. The route reflector executes the route configuration policy based on the marks, and changes a next-hop node of mutual access between branch devices to a routing black hole, thereby forbidding mutual access between the branch devices.

Further, a network administrator on a branch device side may configure the route configuration policy by using the management device, and send the route configuration policy to the route reflector, so that an operator side does not need to learn network planning on the branch device side, thereby reducing network operation costs and improving flexibility of traffic control.

Optionally, the access control policies in Embodiments 1 to 5 and the route configuration policy in Embodiment 6 are all generated by the management device, and a management platform may run on the management device, so that a user may configure an access control policy or a route configuration policy in a one-click manner by using the management platform, and further, access permission between any two nodes may be precisely controlled.

It should be noted that the technical solution in the foregoing embodiment runs in an SD-WAN network architecture. In an actual working process, a usage scenario of the traffic control method provided in this embodiment of this application may be further applied to another network architecture. This is not limited in this embodiment of this application.

In terms of a hardware structure, the foregoing method may be implemented by one physical device, or may be jointly implemented by a plurality of physical devices, or may be a logical function module in a physical device. This is not specifically limited in this embodiment of this application.

Figure 11:
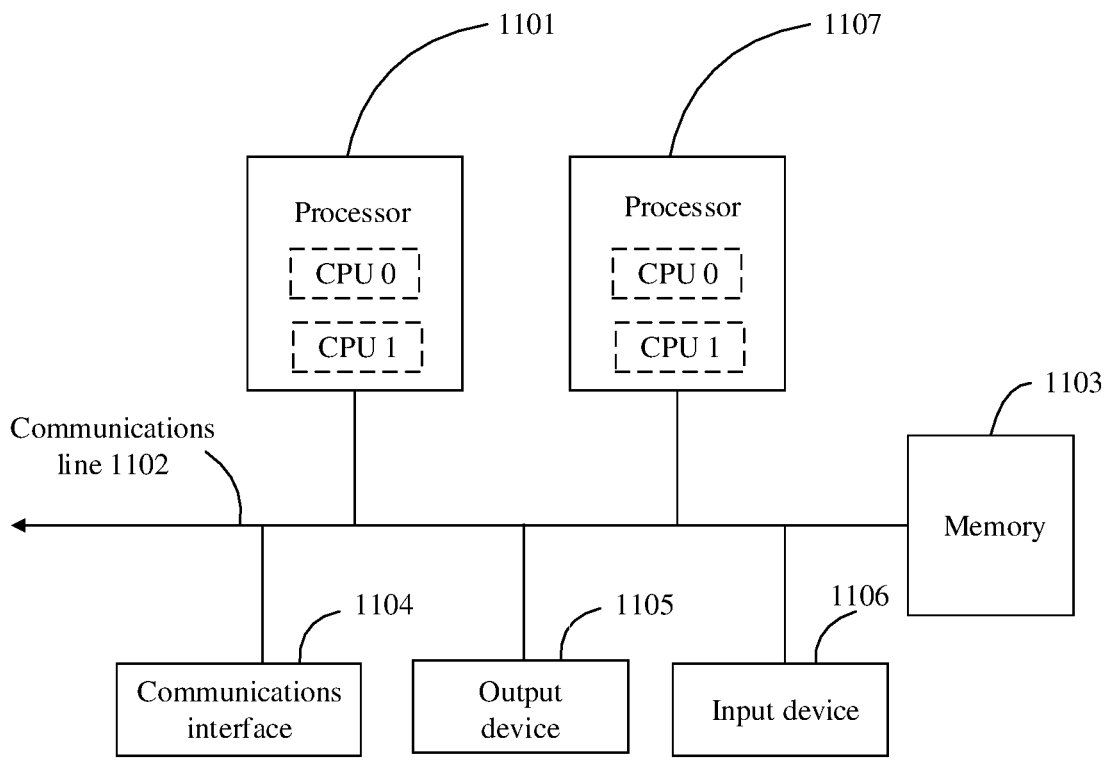
FIG. 11 is a schematic diagram of a physical apparatus of a network device according to an embodiment of this application.

For example, the traffic control method may be implemented by using an electronic device in FIG. 11. FIG. 11 is a schematic structural diagram of hardware of an electronic device according to an embodiment of this application. The electronic device may be a central device or a route reflector in the embodiments of the present invention. The electronic device includes at least one processor 1101, a communications line 1102, a memory 1103, and at least one communications interface 1104.

The processor 1101 may be a general-purpose central processing unit (CPU), a microprocessor, an application-specific integrated circuit (ASIC), or one or more integrated circuits configured to control program execution of the solutions of this application.

The communications line 1102 may include a channel, to transfer information between the foregoing components.

The communications interface 1104 is any apparatus such as a transceiver, and configured to communicate with another device or a communications network such as the Ethernet, a radio access network (RAN), or a wireless local area network (WLAN).

The memory 1103 may be, but is not limited to, a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, and a Blu-ray disc, or the like), a magnetic disk storage medium or another magnetic storage device, or any other medium that can be used to carry or store expected program code in an instruction or data structure form and can be accessed by a computer. The memory may exist independently, and is connected to the processor by using the communications line 1102. Alternatively, the memory may be integrated with the processor.

The memory 1103 is configured to store computer-executable instructions for executing the solutions of this application, and the processor 1101 controls execution of the instructions. The processor 1101 is configured to execute the computer-executable instructions stored in the memory 1103, to implement the traffic control method provided in the foregoing embodiment of this application.

Optionally, the computer-executable instructions in this embodiment of this application may also be referred to as application program code. This is not specifically limited in this embodiment of this application.

During specific implementation, in an embodiment, the processor 1101 may include one or more CPUs, for example, a CPU0 and a CPU1 shown in FIG. 11.

During specific implementation, in an embodiment, the electronic device may include a plurality of processors, for example, the processor 1101 and a processor 1107 that are shown in FIG. 11. Each of the processors may be a single-CPU processor, or may be a multi-CPU processor. The processor herein may be one or more devices, circuits, and/or processing cores configured to process data (for example, computer program instructions).

During specific implementation, in an embodiment, the electronic device may further include an output device 1105 and an input device 1106. The output device 1105 communicates with the processor 1101, and may display information in a plurality of manners. For example, the output device 1105 may be a liquid crystal display (LCD), a light-emitting diode (LED) display device, a cathode ray tube (CRT) display device, or a projector. The input device 1106 communicates with the processor 1101, and may receive user input in a plurality of manners. For example, the input device 1106 may be a mouse, a keyboard, a touch-screen device, or a sensing device.

The electronic device may be a general-purpose device or a dedicated device. During specific implementation, the electronic device may be a server, a wireless terminal device, an embedded device, or a device that has a structure similar to that in FIG. 11. A type of the electronic device is not limited in this embodiment of this application.

In this embodiment of this application, the electronic device may be divided into function units based on the foregoing method example. For example, the function units may be obtained through division corresponding to the functions, or two or more functions may be integrated into one processing unit. The integrated unit may be implemented in a form of hardware, or may be implemented in a form of a software functional unit. It should be noted that, in this embodiment of this application, division into units is an example, and is merely a logical function division. In actual implementation, another division manner may be used.

Figure 12:
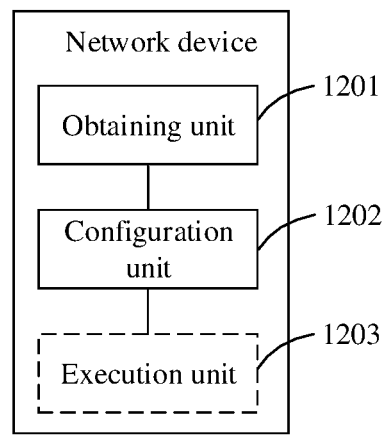
FIG. 12 is a schematic diagram of a virtual apparatus of a network device according to an embodiment of this application.

For example, the function units are obtained through division in an integrated manner. FIG. 12 is a schematic structural diagram of a network device according to an embodiment of this application.

As shown in FIG. 12, a network device provided in this embodiment of this application includes an obtaining unit 1201, configured to obtain a configuration policy from a management device, where the configuration policy is used to control access between a plurality of branch devices, and each of the plurality of branch devices is connected to the network device, and a configuration unit 1202, configured to configure a destination of traffic between the branch devices based on the configuration policy obtained by the obtaining unit 1201, so that the traffic between the branch devices is transmitted to the configured destination.

Optionally, the network device is a central device, and the obtaining unit 1201 is further configured to obtain a redirection policy from the management device, where the redirection policy is used to control traffic redirection.

The configuration unit 1202 is further configured to configure a destination of access traffic of the branch devices to a filtering device based on the redirection policy, where the filtering device is configured to control mutual access permission between the plurality of branch devices and/or mutual access permission between the network device and the plurality of branch devices based on an access control policy.

Optionally, the obtaining unit 1201 is further configured to receive access traffic from a target branch device, where the target branch device is one of the plurality of branch devices.

The device further includes an execution unit 1203, configured to redirect the access traffic of the target branch device to the filtering device.

Optionally, the access control policy includes forbidding traffic access of the target branch device to all or some other branch devices connected to the network device.

Optionally, the obtaining unit 1201 is further configured to obtain return traffic from the filtering device, where the return traffic is traffic fed back by a local area network LAN device after the LAN device obtains the access traffic of the target branch device, the LAN device is configured to provide a network service to the target branch device, and the return traffic is filtered by the filtering device.

The device further includes an execution unit 1203, configured to send the return traffic to the target branch device.

Optionally, the filtering device is connected in series between the network device and the LAN device. The filtering device is configured to filter, based on the access control policy, traffic transmitted between the network device and the LAN device.

Optionally, the filtering device is deployed on the network device in bypass mode, the network device is directly connected to the LAN device, and the obtaining unit 1201 is further configured to obtain filtered traffic from the filtering device, where the filtered traffic is traffic obtained after the filtering device filters the access traffic of the target branch device.

The execution unit 1203 is further configured to send the filtered traffic to the LAN device.

Optionally, the execution unit 1203 is further configured to send the return traffic to the filtering device based on the redirection policy, where the filtering device is configured to filter the return traffic and send filtered return traffic to the network device.

Optionally, there are a plurality of filtering devices, and the plurality of filtering devices include at least an active filtering device and a standby filtering device. The execution unit 1203 is further configured to: redirect the access traffic of the target branch device to the active filtering device based on the redirection policy. The execution unit 1203 is further configured to: redirect the access traffic of the target branch device to the standby filtering device based on the redirection policy when it is detected that the active filtering device works abnormally.

Optionally, there are a plurality of network devices, the network devices include at least a first sub-network device and a second sub-network device, the first sub-network device is connected to the second sub-network device, the second sub-network device is a standby device, and the execution unit 1203 is further configured to send obtained traffic to the second sub-network device when the first sub-network device works abnormally.

Optionally, the network device is a route reflector, and the obtaining unit 1201 is further configured to obtain a route configuration policy from the management device, where the route configuration policy is used to filter access traffic between the branch devices.

The configuration unit 1202 is further configured to set a routing address of mutual access between the branch devices to a routing black hole based on the route configuration policy.

Figure 13:
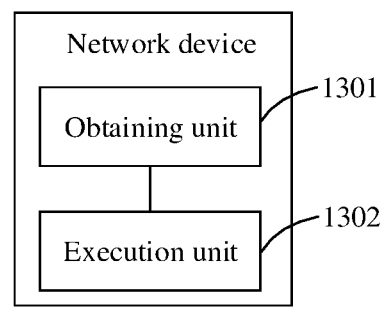
FIG. 13 is a schematic diagram of a virtual apparatus of another network device according to an embodiment of this application.

As shown in FIG. 13, another network device provided in this embodiment of this application includes an obtaining unit 1301, configured to obtain access traffic from a plurality of branch devices, and an execution unit 1302, configured to control the access traffic between the plurality of branch devices that is obtained by the obtaining unit 1301 to be transmitted to a destination configured in a configuration policy, where the configuration policy is a policy in the network device.

Optionally, the network device is a central device, and the configuration policy is a redirection policy. The obtaining unit 1301 is further configured to receive access traffic from a target branch device, where the target branch device is one of the plurality of branch devices.

The execution unit 1302 is further configured to redirect the access traffic of the target branch device to the filtering device based on the redirection policy, where the filtering device is configured to control mutual access permission between the plurality of branch devices and/or mutual access permission between the network device and the plurality of branch devices based on an access control policy.

Optionally, the obtaining unit 1301 is further configured to obtain return traffic from the filtering device, where the return traffic is traffic fed back by a local area network LAN device after the LAN device obtains the access traffic of the target branch device, the LAN device is configured to provide a network service to the target branch device, and the return traffic is filtered by the filtering device.

The execution unit 1302 is further configured to send the return traffic to the target branch device.

Optionally, the network device is a route reflector, and the configuration policy is a route configuration policy. The execution unit 1302 is further configured to set a routing address of mutual access between the branch devices to a routing black hole based on the route configuration policy.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed communication method, the relay device, the host base station, and the computer storage medium may be implemented in other manners. For example, the described apparatus embodiment is merely an example. For example, division into units is merely logical function division and may be other division in actual implementation. For example, a plurality of units or components may be combined or integrated into another system, or some features may be ignored or not performed.

In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a read-only memory (English full name: Read-Only Memory, ROM for short), a random access memory (English full name: Random Access Memory, RAM for short), a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A traffic control method, comprising:
   obtaining, by a network device, a configuration policy from a management device, wherein the configuration policy is associated with controlling access between a plurality of branch devices, and wherein each of the plurality of branch devices is connected to the network device;
   configuring, by the network device, a destination for all traffic being sent between the plurality of branch devices based on the configuration policy, wherein:
      the configuring of the destination for all the traffic being sent between the plurality of branch devices causes the traffic to be transmitted to the destination and prevents access between each branch device of the plurality of branch devices and each other branch device, and
      the destination is a filtering device on the network device;

receiving, by the network device, access traffic from a target branch device, wherein the target branch device is one of the plurality of branch devices;

redirecting, by the network device, all of the access traffic of the target branch device to the filtering device;

obtaining, by the network device, filtered traffic from the filtering device, wherein the filtered traffic is traffic obtained after the filtering device filters the access traffic of the target branch device; and sending, by the network device, the filtered traffic to a local area network (LAN) device.

2. The method according to claim 1, wherein the network device is a central device; and wherein the obtaining the configuration policy from the management device comprises:

obtaining, by the network device, a redirection policy from the management device, wherein the redirection policy is associated with controlling traffic redirection; and wherein the configuring the destination for all the traffic being sent between the branch devices based on the configuration policy comprises:

configuring, by the network device, the destination of access traffic of the branch devices to be the filtering device based on the redirection policy, wherein the filtering device is configured to control, based on an access control policy, at least one of mutual access permission between the plurality of branch devices or mutual access permission between the network device and the plurality of branch devices.

3. The method according to claim 2, wherein the access control policy comprises forbidding traffic access of the target branch device to all, or some, other branch devices connected to the network device.

4. The method according to claim 2, further comprising performing, after the redirecting the access traffic of the target branch device to the filtering device based on the redirection policy:

obtaining, by the network device, return traffic from the filtering device, wherein the return traffic is traffic fed back by the LAN device after the LAN device obtains the access traffic of the target branch device, wherein the LAN device is configured to provide a network service to the target branch device, and wherein the return traffic is filtered by the filtering device; and sending, by the network device, the return traffic to the target branch device.

5. The method according to claim 4, wherein the filtering device is deployed on the network device in bypass mode, and wherein the network device is directly connected to the LAN device.

6. The method according to claim 4, further comprising performing, before the obtaining, by the network device, the return traffic from the filtering device:

sending, by the network device, the return traffic to the filtering device based on the redirection policy, wherein the filtering device is configured to filter the return traffic and send filtered return traffic to the network device.

7. The method according to claim 1, wherein the network device is a route reflector;

wherein the obtaining the configuration policy from the management device comprises:

obtaining, by the network device, a route configuration policy from the management device, wherein the route configuration policy is associated with filtering access traffic between the branch devices; and wherein the configuring, by the network device, the destination for all traffic being sent between the branch devices based on the configuration policy further comprises:

setting, by the network device, a routing address of mutual access between the branch devices to a routing black hole based on the route configuration policy.

8. A network device, comprising:

a processor; and a non-transitory computer readable memory storing a program for execution by the processor, the program including instructions to:

obtain a configuration policy from a management device, wherein the configuration policy is associated with controlling access between a plurality of branch devices, and wherein each of the plurality of branch devices is connected to the network device; and configure a destination for all traffic being sent between the plurality of branch devices based on the configuration policy, wherein:

configuring the destination of the traffic causes the traffic being sent between the plurality of branch devices to be transmitted to the destination and prevents access between each branch device of the plurality of branch devices and each other branch device, and the destination is a filtering device on the network device;

receive access traffic from a target branch device, wherein the target branch device is one of the plurality of branch devices;

redirect all of the access traffic of the target branch device to the filtering device;

obtain, by the network device, filtered traffic from the filtering device, wherein the filtered traffic is traffic obtained after the filtering device filters the access traffic of the target branch device; and send, by the network device, the filtered traffic to a local area network (LAN) device.

9. The device according to claim 8, wherein the network device is a central device; and wherein the program further includes instructions to:

obtain a redirection policy from the management device, wherein the redirection policy is associated with controlling traffic redirection; and configure the destination of all access traffic being sent the branch devices to the filtering device based on the redirection policy, wherein the filtering device is configured to control at least one of a mutual access permission between the plurality of branch devices or a mutual access permission between the network device and the plurality of branch devices based on an access control policy.

10. The device according to claim 9, wherein the program further includes instructions to:

obtain return traffic from the filtering device, wherein the return traffic is traffic fed back by the LAN device after the LAN device obtains the access traffic of the target branch device, wherein the LAN device is configured to provide a network service to the target branch device, and wherein the return traffic is filtered by the filtering device; and send the return traffic to the target branch device.

* * * * *